United States Patent
Kelly et al.

(10) Patent No.: US 12,443,872 B2
(45) Date of Patent: Oct. 14, 2025

(54) MEASURING QUANTUM STATE PURITY

(71) Applicant: Google LLC, Mountain View, CA (US)

(72) Inventors: Julian Shaw Kelly, Santa Barbara, CA (US); Zijun Chen, Santa Barbara, CA (US); Sergio Boixo Castrillo, Rancho Palos Verdes, CA (US)

(73) Assignee: Google LLC, Mountain View, CA (US)

( * ) Notice: Subject to any disclaimer, the term of this patent is extended or adjusted under 35 U.S.C. 154(b) by 961 days.

(21) Appl. No.: 17/623,177

(22) PCT Filed: Oct. 24, 2019

(86) PCT No.: PCT/US2019/057824
§ 371 (c)(1),
(2) Date: Dec. 27, 2021

(87) PCT Pub. No.: WO2020/263300
PCT Pub. Date: Dec. 30, 2020

(65) Prior Publication Data
US 2022/0269973 A1 Aug. 25, 2022

Related U.S. Application Data

(60) Provisional application No. 62/868,349, filed on Jun. 28, 2019.

(51) Int. Cl.
*G06N 10/60* (2022.01)
*G06N 10/20* (2022.01)
*G06N 10/70* (2022.01)

(52) U.S. Cl.
CPC ............. *G06N 10/60* (2022.01); *G06N 10/20* (2022.01); *G06N 10/70* (2022.01)

(58) Field of Classification Search
CPC ......... G06N 10/60; G06N 10/20; G06N 10/70
See application file for complete search history.

(56) References Cited

U.S. PATENT DOCUMENTS

2004/0109631 A1*  6/2004  Franson ................. B82Y 10/00
                                                                385/15
2017/0286858 A1  10/2017  La Cour et al.
(Continued)

FOREIGN PATENT DOCUMENTS

| CA | 3133427 | 4/2019 |
| CN | 109643398 | 4/2019 |
| WO | WO 2013006836 A1 | 1/2013 |

OTHER PUBLICATIONS

Boixo, Sergio, et al. "Characterizing quantum supremacy in near-term devices." Nature Physics 14.6 (2018): 595-600. (Year: 2018).*

(Continued)

*Primary Examiner* — James T Tsai
(74) *Attorney, Agent, or Firm* — Fish & Richardson P.C.

(57) ABSTRACT

Methods, systems and apparatus for measuring quantum state purity. In one aspect, a method for determining an average purity of multiple output quantum states, wherein the multiple output quantum states correspond to applications of respective random quantum circuits of a same circuit depth to a same initial quantum state, the method including: obtaining a plurality of data items, wherein each data item corresponds to a respective random quantum circuit of the same circuit depth and represents a probability that application of the respective random quantum circuit to the initial quantum state produces a respective measurement result; calculating a variance of a plurality of data items; determining a Porter-Thomas distribution having a dimension equal to a dimension of each output quantum state; and dividing the calculated variance by a variance of the Porter-Thomas distribution to determine the average purity.

15 Claims, 3 Drawing Sheets

(56) References Cited

U.S. PATENT DOCUMENTS

| | | | |
|---|---|---|---|
| 2018/0101784 A1 | 4/2018 | Rolfe et al. | |
| 2018/0260732 A1 | 9/2018 | Bloom et al. | |
| 2019/0156239 A1* | 5/2019 | Martinis | G06N 10/70 |
| 2020/0005186 A1* | 1/2020 | Romero | G06N 10/60 |
| 2020/0044749 A1* | 2/2020 | Rauschenbach | G02F 1/395 |
| 2020/0274554 A1* | 8/2020 | Aspuru-Guzik | G06N 10/20 |
| 2022/0230087 A1* | 7/2022 | Castrillo | G06N 10/20 |

OTHER PUBLICATIONS

Weinstein, Yaakov S., Winton G. Brown, and Lorenza Viola. "Parameters of pseudorandom quantum circuits." Physical Review A—Atomic, Molecular, and Optical Physics 78.5 (2008): 052332. (Year: 2008).*

Brown et al., "Quantum pseudo-randomness from cluster-state quantum computation," arXiv, May 15, 2008, 5 pages.

Hangleiter et al., "Anticoncentration theorems for schemes showing a quantum speedup", arXiv, May 15, 2018, 14 pages.

Office Action in Australian Appln. No. 2019454816, dated Feb. 1, 2023, 4 pages.

Notice of Allowance in Australian Appln. No. 2019454816, mailed on Aug. 30, 2023, 3 pages.

Dang, "Distributed Matrix Product State Simulations of Large-Scale Quantum Circuits" Thesis for the degree of Doctor of Master of Science, The University of Melbourne, School of Physics, Oct. 20, 2017, 50 pages.

Markov et al., "Quantum Supremacy is Both Closer and Farther than it Appears" CoRR, Submitted on Sep. 2018, arXiv:1807:10749v3, 32 pages.

Office Action in Australian Appln. No. 2023282270, mailed on Sep. 2, 2024, 6 pages.

Office Action in European Appln. No. 19804962.9, mailed on Oct. 2, 2024, 8 pages.

Rodrigues et al., "Validation of Quantum Simulations: Assessing Efficiency and Reliability in Experimental Implementations" Master Dissertation for the degree of Doctor of Engineering Physics, Universidade do Minho, Nov. 2018, 163 pages.

Notice of Allowance in Australian Appln. No. 2023282270, mailed on Dec. 4, 2024, 3 pages.

Office Action in Chinese Appln. No. 201980097997.8, mailed on Dec. 16, 2024, 10 pages (with English translation).

AU Office Action in Australian Appln. No. 2019454816, dated Nov. 21, 2022, 3 pages.

Office Action in Canadian Appln. No. 3144241, dated Jan. 16, 2023, 5 pages.

Boixo et al., "Characterizing quantum supremacy in near-term devices," arXiv, Apr. 5, 2017, 23 pages.

Bouland et al., "On the complexity and verification of quantum random circuit sampling," Nature Physics, Oct. 29, 2018, pp. 159-163.

Feng et al., "Estimating the Coherence of Noise in Quantum Control of a Solid-State Qubit," Physical Review Letters, Dec. 20, 2016, 117(260501):1-6.

Haffner et al., "Scalable multi-particle entanglement of trapped ions," arXiv, Mar. 23, 2006, 17 pages.

International Preliminary Report on Patentability in International Appln. No. PCT/US2019/057824, dated Jan. 6, 2022, 11 pages.

International Search Report in International Appln. No. PCT/US2019/057824, dated Mar. 12, 2020, 18 pages.

Magesan et al., "Robust randomized benchmarking of quantum processes," arXiv, Sep. 19, 2010, 5 pages.

Neill et al., "A blueprint for demonstrating quantum supremacy with superconducting qubits," arXiv, Sep. 19, 2017, 22 pages.

Steiger et al., "ProjectQ: An open source software framework for quantum computing," arXiv, Dec. 23, 2016, 11 pages.

Wallman et al., "Estimating the coherence of noise," New Journal of Physics, Nov. 5, 2015, 17(113020):1-13.

Weinstein et al., Parameters of Pseudo-Random Quantum Circuits arXiv, Aug. 27, 2008, 17 pages.

Wikipedia.com [online], "Purity (quantum mechanics)," Jun. 29, 2009, retrieved on Aug. 29, 2022, retrieved from URL<https://en.wikipedia.org/wiki/Purity_(quantum_mechanics)>, 5 pages.

\* cited by examiner

Obtain measurement data corresponding to measured results of multiple quantum hardware benchmarking experiments
202

Calculate probabilities of respective measured results from the measurement data and for each quantum hardware benchmarking experiment
204

Calculate statistics of the probabilities of the measured results to determine average quantum state purity
206

FIG. 2

MEASURING QUANTUM STATE PURITY

CROSS-REFERENCE TO RELATED APPLICATION

This application is a National Stage Application under 35 U.S.C. § 371 and claims the benefit of International Application No. PCT/US2019/057824, filed on Oct. 24, 2019, which claims priority to U.S. Provisional Application Ser. No. 62/868,349, filed on Jun. 28, 2019. The disclosures of the prior applications are considered part of and are incorporated by reference in the disclosure of this application.

BACKGROUND

This specification relates to quantum computing.

Quantum computing uses quantum-mechanical phenomena such as superposition and entanglement to perform computations. A quantum circuit is one example model for quantum computation in which a computation is a sequence of quantum logic gates, which are reversible transformations on a quantum mechanical analog of an n-bit register.

SUMMARY

This specification describes techniques for measuring quantum state purity.

In general, one innovative aspect of the subject matter described in this specification can be implemented in a method for determining an average purity of multiple output quantum states, wherein the multiple output quantum states correspond to applications of respective random quantum circuits of a same circuit depth to a same initial quantum state, the method comprising: obtaining a plurality of data items, wherein each data item corresponds to a respective random quantum circuit of the same circuit depth and represents a probability that application of the respective random quantum circuit to the initial quantum state produces a respective measurement result; calculating a variance of a plurality of data items; determining a Porter-Thomas distribution having a dimension equal to a dimension of each output quantum state; and dividing the calculated variance by a variance of the Porter-Thomas distribution to determine the average purity.

Other implementations of this aspect include corresponding computer systems, apparatus, and computer programs recorded on one or more computer storage devices, each configured to perform the actions of the methods. A system of one or more computers can be configured to perform particular operations or actions by virtue of having software, firmware, hardware, or a combination thereof installed on the system that in operation causes or cause the system to perform the actions. One or more computer programs can be configured to perform particular operations or actions by virtue of including instructions that, when executed by data processing apparatus, cause the apparatus to perform the actions.

The foregoing and other implementations can each optionally include one or more of the following features, alone or in combination. In some implementations each output quantum state is represented by a depolarizing channel with depolarizing channel parameter p representing a probability that the output quantum state is a pure state output.

In some implementations the depolarizing channel parameter p is equal to one, and wherein the plurality of data items are distributed according to the Porter-Thomas distribution.

In some implementations the variance of the Porter-Thomas distribution variance is equal to $$\frac{D-1}{D^2(D+1)},$$

where D represents the dimension of the Porter-Thomas distribution.

In some implementations the depolarizing channel parameter p is equal to zero, and wherein the plurality of data items are distributed according to a $\delta$-function located at 1/D, where D represents the dimension of the Porter-Thomas distribution.

In some implementations the random quantum circuits comprise random quantum circuits generated for a cross entropy benchmarking experiment.

In some implementations a random quantum circuit comprises a quantum circuit that includes one or more quantum gates that are randomly sampled from a predetermined set of quantum gates.

In some implementations the random quantum circuits each comprise a same number of quantum gates.

In some implementations the purity comprises single qubit purity, and wherein the random quantum circuits each comprise multiple single qubit quantum gates with error rates within a same predetermined range.

In some implementations the purity comprises n-qubit purity, and wherein each of the random quantum circuits comprises i) multiple single qubit quantum gates with error rates within a same predetermined range, and ii) a same n-qubit quantum gate.

In some implementations the method further comprises obtaining measurement data corresponding to measurement results of the applications of respective random quantum circuits of the same circuit depth to the same initial quantum state; and calculating, using the obtained measurement data, the probabilities that applications of respective random quantum circuit to the initial quantum state produces respective measurement results.

In some implementations the method further comprises processing the obtained plurality of data items to determine a quantum state fidelity of the multiple output quantum states; and computing a difference between the determined quantum state fidelity and the determined average purity loss, wherein the computed difference represents systematic control error.

In some implementations the method further comprises determining one or more adjustments to quantum hardware control parameters based on the computed difference representing systematic control error; and implementing the determined one or more adjustments to perform quantum computations using quantum computing hardware.

In some implementations the method further comprises determining one or more adjustments to quantum hardware control parameters based on the determined average purity; and implementing the determined one or more adjustments to perform quantum computations using quantum computing hardware.

The subject matter described in this specification can be implemented in particular ways so as to realize one or more of the following advantages.

A system implementing the presently described techniques can determine the purity of a quantum state using a fixed number of experiments. For example, a system implementing the presently described techniques can determine quantum state purity from raw quantum hardware benchmarking data with exponentially fewer number of pulse sequences compared to known techniques such as full state tomography. This favorable scaling allows the presently described techniques for measuring quantum state purity to be extended to quantum hardware that includes large numbers of qubits.

In addition, the presently described techniques can be performed as part of a benchmarking process for characterizing the performance of quantum hardware without requiring additional experiments to be performed. For example, the presently described techniques can be applied in conjunction with cross entropy benchmarking processes. Performing the presently described method for measuring quantum state purity can also enable a system to error budget total error into control error and decoherence error.

In addition, the presently described techniques can be performed with no knowledge of the specific gate sequence performed—as long as the benchmarking experiments introduce sufficient randomization of the Hilbert Space, Porter-Thomas statistics apply.

The presently described techniques can be applied to improve quantum computing hardware and quantum control—a critical feature of high fidelity quantum computing. For example, adjustments that can improve the accuracy of existing quantum computing hardware, e.g., improve the accuracy at which the quantum computing hardware performs quantum operations, can be determined based on determined purities of and errors in quantum states produced by the quantum computing hardware. Furthermore, the purity can be used to optimise parameters of control models used to implement quantum circuits/quantum gates.

Details of one or more implementations of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 2 is a flow diagram of an example process for determining average quantum state purity.

DETAILED DESCRIPTION

Overview

Figure 1:
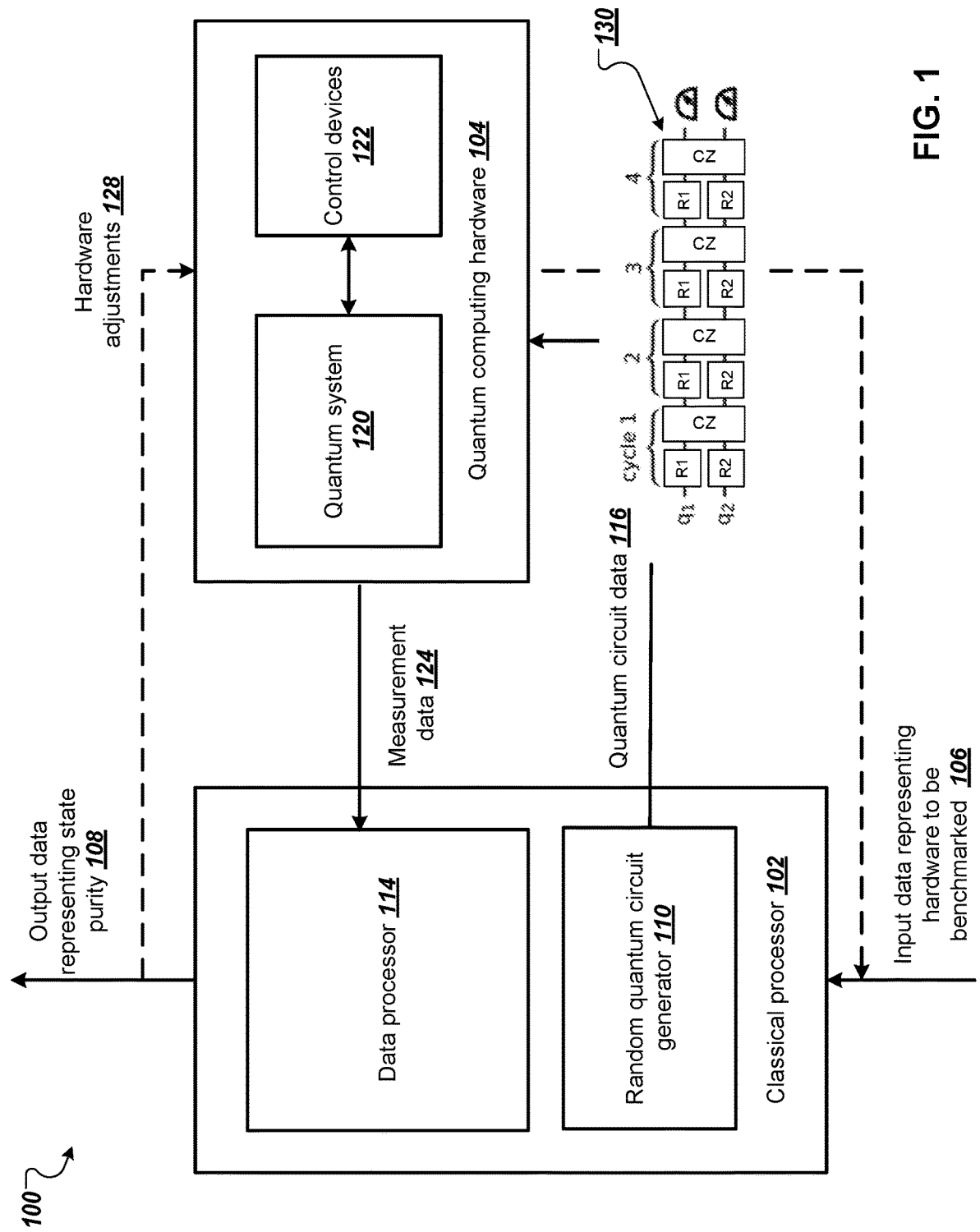
FIG. 1 depicts an example system for benchmarking the performance of quantum computing hardware.

A quantum circuit is a model for quantum computation in which quantum logic gates are applied in a specific sequence to a register of qubits to encode quantum information. In theory, any quantum algorithm can be implemented with high precision by applying a correctly chosen sequence of quantum logic gates. However, in practice quantum logic gates are error prone—experiments attempt to implement unitary quantum operations representing ideal quantum logic gates but what are actually implemented are noisy quantum operations.

Quantum circuits always have some contribution of error due to physical error mechanisms. It is important to be able to distinguish between systematic errors and errors that are due to noise, since systematic errors can be reduced through careful calibration of system control. Distinguishing between systematic errors and noise errors can be achieved by measuring the purity of an output state of a quantum circuit.

State purity is typically measured using state tomography, where a full density matrix is reconstructed and used to quantify the state purity. State tomography involves expanding a single cross entropy benchmarking sequence into a collection of sequences each appended with single-qubit gates. Unfortunately, full tomographic reconstruction scales exponentially in the number of qubits, both for the number of sequences needed as well as the number of measurements needed per sequence. For example, state tomography of a single qubit takes at minimum 3 experiments to constrain X, Y and Z directions in the Bloch Sphere. Full n-qubit state tomography typically takes 3n experiments. Additionally, there are $N=2n$ output states in each experiment. If $1/\sqrt{2^N}$ statistics are assumed, $N^2=2^{2n}$ measurements per experiment are required. Given the double-exponential scaling, state tomography is intractable past a small number of qubits, e.g., for 8 qubits or more.

This specification describes techniques for measuring quantum state purity using raw measurement data taken from quantum hardware benchmarking experiments. Statistics of probability distributions of the measurement data are calculated and used to determine quantum state purity. State purity can therefore be accurately measured using a total fixed number of experiments instead of an exponential number. The determined state purity can further be used to identify systematic control errors incurred during respective quantum hardware benchmarking experiments. Total error can therefore be identified as control error and/or decoherence error using a single quantum hardware benchmarking experiment.

In this specification the term "quantum state purity" is understood to describe a re-scaled quantum state purity defined as $$\text{Purity} = \frac{D}{D-1}\left(Tr(\rho^2) - \frac{1}{D}\right) \quad (1)$$

where the rescaling ensures that a fully decohered state has a purity equal to zero and a pure state has a purity equal to one. In Equation (1), D represents quantum system Hilbert space size and $\rho$ represents the quantum state. The purity given by Equation (1) can be understood as the squared length of the generalized Bloch vector in D dimensions. For example, for a qubit (D=2) Equation (1) gives $\langle X \rangle^2 + \langle Y \rangle^2 + \langle Z \rangle^2$.

Example Hardware

FIG. 1 depicts an example system for benchmarking the performance of quantum computing hardware. The example system 100 is an example of a system implemented as classical and quantum computer programs on one or more classical and quantum computers in one or more locations, in which the systems, components, and techniques described below can be implemented.

The system 100 includes a classical processor 102 in data communication with quantum computing hardware 104. For convenience, the classical processor 102 and quantum computing hardware 104 are illustrated as separate entities, however in some implementations the classical processor 102 can be included in quantum computing hardware 104, e.g., the quantum computing hardware 104 can include one or more components for performing classical computing operations.

The quantum computing hardware 104 includes components for performing quantum computations using quantum circuits. For example, the quantum computing hardware 104 includes a quantum system 120 and control devices 122. The quantum system 120 includes one or more multi-level quantum subsystems, e.g., qubits, that are used to perform algorithmic operations or quantum computations. The specific realization of the multi-level quantum subsystems that the quantum computing hardware 104 includes and how they interact with one another is dependent on a variety of factors including the type of quantum computations that the quantum computing hardware is performing. For example, the multi-level quantum subsystems may include qubits that are realized via atomic, molecular or solid-state quantum systems. In other examples the qubits may include, but are not limited to, superconducting qubits or semi-conducting qubits.

The multi-level quantum subsystems can be frequency tunable. For example, each qubit may have associated operating frequencies that can be adjusted, e.g., using one or more control devices 122, through application of voltage pulses via one or more drivelines coupled to the qubit. Example operating frequencies include qubit idling frequencies, qubit interaction frequencies, and qubit readout frequencies. Different frequencies correspond to different operations that the qubit can perform. For example, setting the operating frequency to a corresponding idling frequency may put the qubit into a state where it does not strongly interact with other qubits, and where it may be used to perform single-qubit gates. As another example, in cases where qubits interact via couplers with fixed coupling, qubits can be configured to interact with one another by setting their respective operating frequencies at some gate-dependent frequency detuning from their common interaction frequency. In other cases, e.g., when the qubits interact via tunable couplers, qubits can be configured to interact with one another by setting the parameters of their respective couplers to enable interactions between the qubits and then by setting the qubit's respective operating frequencies at some gate-dependent frequency detuning from their common interaction frequency. Such interactions may be performed in order to perform multi-qubit gates.

The control devices 122 can further include measurement devices, e.g., readout resonators. Measurement results (measurement data) obtained via measurement devices may be provided to classical processors included in the quantum computing hardware 104 or to the classical processor 102 for processing and analyzing.

The classical processor 102 receives as input data 106 representing quantum hardware to be benchmarked. For example, the input data 106 may include data representing a quantum logic gate or quantum circuit that the quantum computing hardware 104 is configured to implement.

The classical processor 102 processes the received input data 106 to generate as output data 108 representing benchmarking results, e.g., properties of implementations of the quantum logic gate or quantum circuit. For example, the output data 108 may include data representing an estimated fidelity and/or purity of quantum states output during implementations of the quantum logic gate or quantum circuit by the quantum hardware 104.

The classical processor 102 includes multiple components for processing received input data. For example, the classical processor 102 can include a random quantum circuit generator 110 and a data processing module 114.

The random quantum circuit generator 110 can be configured to define random quantum circuits based on the quantum computing hardware 104 and the received input data 106.

A random quantum circuit is a quantum circuit that includes one or more quantum gates that are randomly sampled from a predetermined set of quantum gates. The type of random quantum circuits defined by the random quantum circuit generator 110 is dependent on the benchmarking experiment being performed by the system 100.

For example, in cases where the performance of single qubits/single qubit operations are to be benchmarked, the random quantum circuit generator 110 can define multiple random quantum circuits that each include one or more respective randomly sampled single qubit gates. For example, the random quantum circuit generator 110 can be configured to randomly sample single qubit gates from a predefined set of single qubit gates, e.g., a set including $$X^{\frac{1}{2}}, Y^{\frac{1}{2}},$$

and T quantum gates, where $$X^{\frac{1}{2}}$$

represents a π/2 rotation around the X axis, $$Y^{\frac{1}{2}}$$

represents a π/2 rotation around the y axis, and T represents a non-Clifford diagonal matrix {0, $e^{i\pi/4}$}. Within a single qubit benchmarking experiment, the single qubit gates included in the random quantum circuits defined by the random quantum circuit generator 110 can have approximately equal error rates, e.g., the error rate of each single qubit gate in a set of single qubit gates from which the random quantum circuit generator 110 samples from are from a predetermine range of error rates.

As another example, in cases where the performance of multiple qubits/multiple qubit operations are to be benchmarked, the random quantum circuit generator 110 can define multiple random quantum circuits that each include one or more respective randomly sampled single qubit gates and a same multi-qubit quantum gate. Again, within a multiple qubit benchmarking experiment, the single qubit gates included in the random quantum circuits defined by the random quantum circuit generator 110 can have approximately equal error rates.

The random quantum circuits defined by the random quantum circuit generator 110 can have different depths. The random quantum circuit generator 110 can define circuits of different depths by applying multiple clock cycles of gates. That is, the random quantum circuit generator 110 can define a random quantum circuit of depth d as being equal to d cycles of a same sequence of gates. In some implementations the random quantum circuit generator 110 can define a sequence of gates, e.g., including multiple randomly sampled single qubit gates followed by a multi-qubit gate, and define multiple random quantum circuits using the defined sequence of gates, where each defined random quantum circuit corresponds to a respective number of cycles of the defined sequence of gates. For example, in plot (a) of FIG. 3 below, the random quantum circuit generator 110 defines 30 different sequences of gates and defines, for each sequence of gates, 500 random quantum circuits corresponding to 1-500 cycles of the sequence of gates.

Quantum circuit 130 is an example of a random quantum circuit generated by the random quantum circuit generator 110. Example quantum circuit 130 shows a benchmarking quantum circuit that is configured to operate on two qubits $q_1$, $q_2$. The example quantum circuit 130 includes four cycles, where each cycle includes two randomly sampled single qubit gates $R_1$, $R_2$ that operate on qubits $q_1$, $q_2$, respectively, and a copy of a two-qubit quantum gate, e.g., in this example a CZ gate.

The classical processor 102 is configured to transmit data 116 representing defined random quantum circuits to the quantum computing hardware 104. The quantum computing hardware 104 is configured to implement the defined random quantum circuits using the quantum system 120 and control devices 122.

The quantum computing hardware 104 can provide as output data representing results of the circuit implementations, e.g., measurement data 124, and transmit the data to the classical processor 102. Each data point in the measurement data 124 received from the quantum computing hardware 104 may include a bit string representing a measured quantum state of a quantum system after a respective random benchmarking circuit has been applied to the quantum system. For example, for a quantum system that includes two qubits, the measurement data may include multiple groups of data points, each group corresponding to a respective random benchmarking circuit and data points in each group including bit strings taking the value 00, 01, 10 or 11 (representing quantum states $|00\rangle$, $|01\rangle$, $|10\rangle$, $|11\rangle$, respectively.) The number of groups of data points is equal to the number of different sequences of gates defined by the random quantum circuit generator 110 multiplied by the total number of different cycles used by the random quantum circuit generator 110 to generate the quantum circuit data 116. The number of data points in each group is equal to the number of times a respective random benchmarking circuit was implemented and measured by the quantum computing hardware. This number of times can be a system parameter preset in advance, or can be specified by the input data 106 and/or the quantum circuit data 116.

The data processing module 114 is configured to process the measurement data 124 received from the quantum computing hardware to determine a quantum state purity representing an average purity of quantum states output by the quantum hardware 104. For example, the data processing module 114 can be configured to perform the example process 300 described below with reference to FIG. 3.

The classical processor 102 provides as output data 108 representing the determined quantum state purity. In some implementations the classical processor 102 may also be configured to determine one or more adjustments to the quantum computing hardware 104 using the determined quantum state purity, e.g., adjustments to control parameters of a control model used to implement quantum operations. Data 128 representing determined adjustments can be provided to and implemented by the quantum computing hardware 104 when performing future computations to improve the operation and/or performance of the quantum computing hardware 104. As an example, adjustments may be made based on optimising a cost function that is dependent on the purity with respect to parameters of a control model.

In some implementations the classical processor 102 may also be configured to perform benchmarking experiments to determine a quantum state fidelity achieved by output states of the quantum hardware 104. Determined quantum state fidelities can be used in conjunction with determined quantum state purities to distinguish between types of errors incurred by the quantum computing hardware 104 and to determine adjustments to how the quantum computing hardware 104 is controlled, as described in more detail below with reference to FIG. 2.

Programming the Hardware

FIG. 2 is a flow diagram of an example process 200 for determining an average purity of multiple output quantum states, where the multiple output quantum states correspond to applications of respective random quantum circuits of a same circuit depth to a same initial quantum state. For convenience, the process 200 will be described as being performed by a system of one or more classical and quantum computing devices located in one or more locations. For example, the system 100 of FIG. 1, appropriately programmed in accordance with this specification, can perform the process 200.

The system obtains measurement data (step 202). The measurement data corresponds to measurement results of the applications of respective random quantum circuits of the same circuit depth to the same initial quantum state.

Each data point in the obtained measurement data can include a bit string representing a measured quantum state of a quantum system after a respective random quantum circuit has been applied to the quantum system. For example, for a quantum system that includes two qubits, the measurement data may include multiple groups of data points, each group corresponding to a respective random quantum circuit and data points in each group including bit strings taking the value 00, 01, 10 or 11 (representing quantum states $|00\rangle$, $|01\rangle$, $|10\rangle$, $|11\rangle$, respectively.) The number of groups of data points is equal to the number of random quantum circuits implemented by the quantum computing hardware. The number of data points in each group is equal to the number of times the respective random quantum circuit is implemented and measured.

The system calculates, from the measurement data, probabilities $P_m$ that application of a respective random quantum circuit to the initial quantum state produces a respective measurement result (step 204). For example, for a quantum system that includes two qubits, the system calculates a probability that each random quantum circuit produces bit strings 00, 01, 10, 11 corresponding to quantum states $|00\rangle$, $|01\rangle$, $|10\rangle$, $|11\rangle$, respectively. Calculating the probabilities can include dividing the number of times a measured result occurs by the total number of measured results for the random quantum circuit. An example graphical representation of calculated probabilities of respective measured results of multiple random quantum circuits (30 circuits and up to 500 cycles) is illustrated and described below with reference to FIG. 3.

The system calculates statistics of the probabilities of the measurement results to determine the average purity of the multiple output quantum states. The system represents each output quantum state by the depolarizing channel given below in Equation (2).

$$\rho = p|\psi\rangle\langle\psi| + (1-p)\frac{\mathbb{1}}{D} \qquad (2)$$

In Equation (2), p represents the probability of a pure state output $|\psi\rangle$, (1−p) represents the probability that the output state is a fully-decohered state, D represents the corresponding quantum system Hilbert space size, and II represents the identity operator. Representing each output quantum state by the depolarizing channel given in Equation (2) can be numerically verified or validated by analogy with the twirling argument applied in randomized benchmarking: the quantum map corresponding to the physical errors is conjugated by random unitaries, which gives a depolarizing channel.

Combining Equations (1) and (2), the output state purity is given by Equation (3) below.

$$\text{Purity} = p^2 \quad (3)$$

Figure 3:
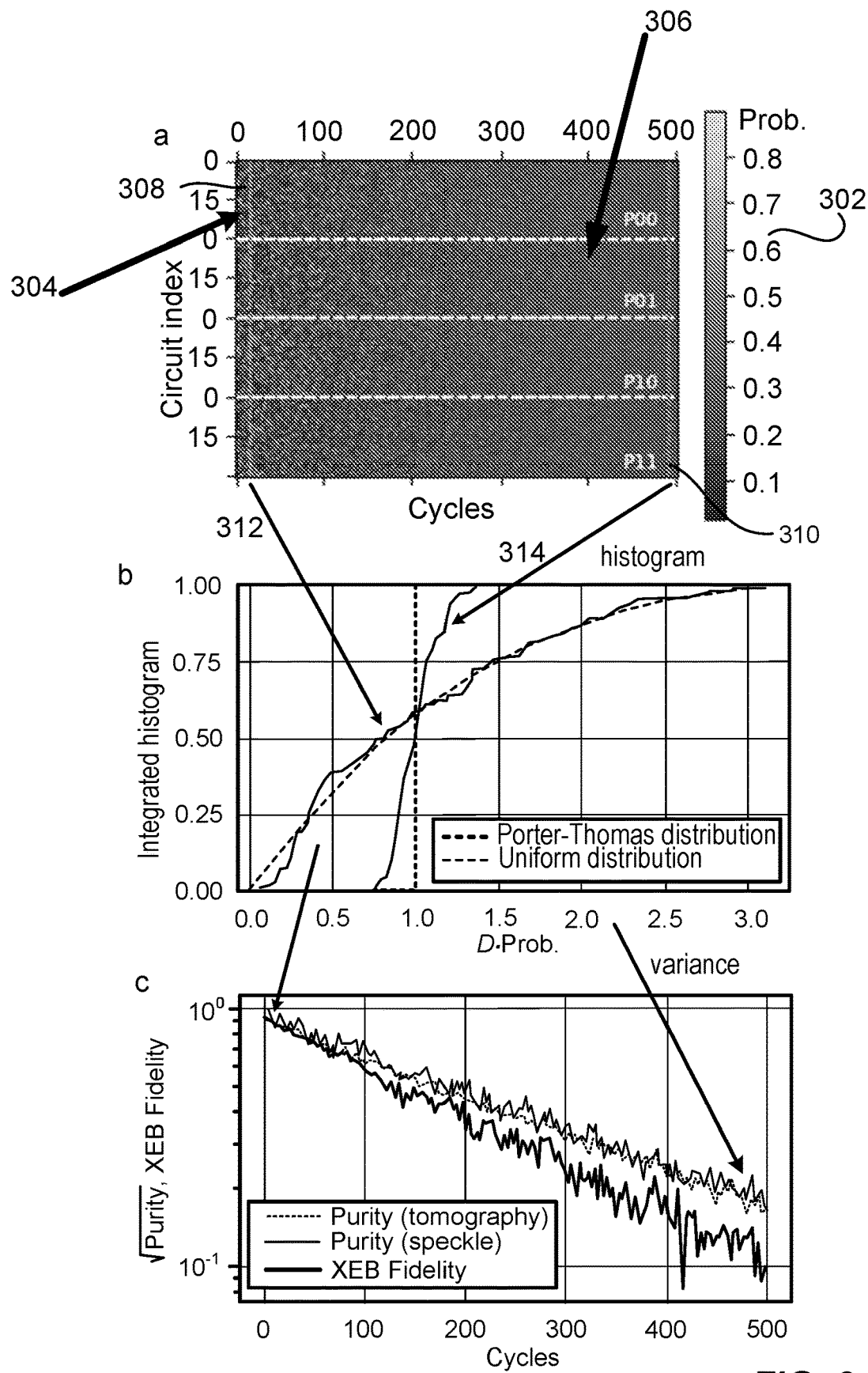
FIG. 3 shows three plots of example measurement data and processed measurement data.

From Equation (2) it can be seen that for p=0 the probability of each output is equal to 1/D. In this case the distribution of the calculated probabilities is a δ-function located at 1/D (the integrated histogram is then a step function, as shown in FIG. 3). In contrast, if p=1 the calculated probabilities $P_m$ of the measured results follow a D-dimensional Porter-Thomas distribution $$\mathcal{P}_{PT}(P_m) = (D-1)(1-P_m)^{D-2} \quad (4)$$

which has average 1/D and variance $$\text{Var}_{PT}(P_m) = \frac{D-1}{D^2(D+1)} \quad (5)$$

For arbitrary p, the distribution of the calculated probabilities can be described by the Porter-Thomas distribution of Equation (4) shrunk towards the average 1/D by the factor p. Since the uniform distribution has no variance, the variance of the distribution of the calculated probabilities is equal to $p^2$ times the Porter-Thomas variance given in Equation (5).

Therefore, to determine the average purity, the system calculates the variance of the calculated probabilities (step 206) and divides the variance of the calculated probabilities by the variance of the Porter-Thomas distribution given in Equation (5) (step 208). That is, the system determines $$\text{Purity} = \text{Var}(P_m) \frac{D^2(D+1)}{D-1} \quad (6)$$

The average purity determined at step 208 can be used as a measure of purity for each output quantum state, i.e., each random quantum circuit. This is because the average purity is determined using multiple random quantum circuits of a same depth, which therefore have a same number of gates. To determine average purities corresponding to circuits with multiple different depths, the example process 200 can be repeated for each depth. In addition, the random quantum circuits can be designed such that the corresponding output states have similar purity. For example, as described above with reference to FIG. 1, to determine single qubit purity, all single qubit gates included in the random quantum circuits can have similar error rates. For two qubits purity, the random quantum circuits can include the same two-qubit gate where only the single qubit gates change between circuits.

In some implementations the system can determine one or more adjustments to quantum computing hardware using the determined average purity, e.g., adjustments to control parameters of a control model used by the quantum computing hardware to implement quantum operations. The determined adjustments can be implemented when performing future computations to improve the operation and/or performance of the quantum computing hardware.

In some implementations the system can further identify systematic control errors in the implementations of the random quantum circuits. For example, the system can further process the measurement data obtained at step 202 to determine a measure of quantum state fidelity, e.g., using techniques such as cross entropy benchmarking techniques. The system can then compare the determined fidelity to the square root of the average purity determined in step 208 and given by Equation (6) to verify their dependence on the number of cycles d (e.g., the depth of the random quantum circuits). Without systematic control errors, the square root of the determined average purity and the determined quantum state fidelity should be equal. However, experimentally, control errors are typically present. The presence of control errors can cause incorrect predictions of an output state $|\psi\rangle$, so control errors give the determined fidelity a higher error than the determine purity. Therefore, the system can determine a fidelity loss per cycle and a purity loss per cycle, and determine the difference between the determined fidelity loss per cycle and purity loss per cycle to obtain the systematic control error per cycle.

In some implementations the system can further determine adjustment to system control parameters to reduce the identified systematic control errors, since the presence of a systematic error indicates that there is experimental room for improvement in how the system is operated. For example, the knowledge that non-negligible control errors exist, can be used to adjust control models used to implement respective operations, e.g., quantum gates, to account for different types of interactions. Example adjustments include running more sophisticated optimizations to learn a control model better, or adding additional terms in a control model to account for new interactions. A control model may represent a mapping between parameters of a quantum gate (e.g. qubit rotation angle, phases, etc.) and control parameters of the physical system used to implement a quantum gate/circuit (e.g. control line voltages, pulse shapes, operating frequencies etc.).

FIG. 3 shows three example plots (a), (b), and (c). Plot (a) plots probabilities of measured results for multiple cross entropy benchmarking experiments (i.e., multiple random quantum circuits defined for a cross entropy benchmarking experiment). For example, the probabilities plotted in Plot (a) can correspond to the probabilities calculated in step 204 of FIG. 2 above. Each point in Plot (a) represents a probability P(|00⟩), P(|10⟩), P(|01⟩), P(|11⟩) that a respective cross entropy benchmarking experiment produces an output bit string 00, 01, 10, 11. The shading of the point represents the respective probability, as defined in key 302. For example, arrow 304 points to a point that represents a probability that random cross entropy benchmarking circuit 20 (out of 30 possible random benchmarking circuits) with depth 6 (out of depths ranging from 1 to 500) produces an output bit string 00. As another example, arrow 306 points to a point that represents a probability that random cross entropy benchmarking circuit 5 (out of the same 30 possible random benchmarking circuits) with depth 400 (out of the same range of depths) produces an output bit string 01.

Plot (a) shows a characteristic speckle pattern at low numbers of cycles over the 30 random benchmarking circuits and probabilities P(|00⟩), P(|10⟩), P(|01⟩), P(|11⟩), e.g., around dashed line 308. The speckle contrast decreases with the number of cycles as decoherence begins to dominate the dynamics, e.g., around dashed line 310.

Plot (b) is an integrated histogram (also referred to as a cumulative distribution) of the probabilities corresponding to vertical lines 308 and 310 in Plot (a), i.e., the probabilities $P(|00\rangle)$, $P(|10\rangle)$, $P(|01\rangle)$, $P(|11\rangle)$ obtained over the 30 random benchmarking circuits for fixed circuit depths 12 and 490. The probabilities have been normalized by the inverse of the Hilbert space dimension, so that the uniform distribution described below is approximately about 1.

Plot (b) shows how, at low cycle numbers, the distribution of the probabilities is well-described by a Porter-Thomas distribution. This is indicated by arrow 312 which corresponds to line 308. Plot (b) also shows how, at high cycle numbers, the distribution of the probabilities approaches a uniform distribution (step function in the integrated histogram). This is indicated by arrow 314 which corresponds to line 310. The transition from the Porter-Thomas distribution into the uniform distribution is a result from the quantum system on which the benchmarking experiments are being performed being exposed to more decoherence (as the number of cycles increases) and state purity decreases.

Plot (c) plots the square root of Purity and cross entropy benchmarking fidelity (on a logarithmic scale) for each circuit depth in the range 1-500, where a square root has been taken of the purity and an exponential fit performed to make the purity directly relatable to the cross entropy benchmarking fidelity loss per cycle. Plot (c) shows that the variance of the distribution of probabilities is directly related to the average state purity. Plot (c) shows three exponential decays corresponding to purity derived according to the techniques described in this specification, purity derived using tomography, and cross-entropy benchmarking fidelity. The purity-derived number per-cycle 0.00276 (determined by an exponential fit) and similar number per-cycle 0.00282 (also determined by an exponential fit) derived from the tomographic measure of purity show good agreement—the presently described techniques and tomographic techniques give similar numbers for purity loss per cycle. The error of cross entropy benchmarking, which also includes control errors, is slightly higher at error per-cycle 0.00349.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible.

The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more classical processors and quantum hardware for determining an average purity of multiple output quantum states of qubits of the quantum hardware, wherein the multiple output quantum states correspond to applications of respective random quantum circuits of a same circuit depth to a same initial quantum state, the method comprising:

applying, by the quantum hardware, the respective random quantum circuits of the same circuit depth to the same initial quantum state of the qubits of the quantum hardware by sending one or more control signals to change a state of the quantum hardware from the initial quantum state to a state in which logic gates included in the random quantum circuit are implemented by the qubits of the quantum hardware;

obtaining, by the one or more classical processors, measurement data corresponding to measurement results of the applications of the respective random quantum circuits to the same initial quantum state of qubits of the quantum hardware;

representing each output quantum state by a depolarizing channel with depolarizing channel parameter p that represents a probability that the output quantum state is a pure state;

computing the average purity of the output quantum states, comprising:

calculating, by the one or more classical processors and using the obtained measurement data, a plurality of data items, wherein each data item corresponds to a respective random quantum circuit of the same circuit depth and represents a probability that application of the respective random quantum circuit to the initial quantum state produces a respective measurement result, wherein a distribution of the probabilities represented by the plurality of data items comprises a scaled Porter Thomas distribution, wherein the scaled Porter Thomas distribution is scaled towards a uniform distribution by the depolarizing channel parameter p;

calculating, by the one or more classical processors, a variance of the scaled Porter Thomas distribution of the probabilities represented by the plurality of data items;

determining, by the one or more classical processors, a variance of an unscaled Porter-Thomas distribution having a dimension equal to a dimension D of each output quantum state; and dividing, by the one or more classical processors, the calculated variance of the scaled Porter Thomas distribution by variance of the unscaled Porter-Thomas distribution with dimension D to determine the average purity.

2. The method of claim 1, wherein the depolarizing channel parameter p is equal to one, and wherein the plurality of data items are distributed according to the unscaled Porter-Thomas distribution.

3. The method of claim 1, wherein the variance of the Porter-Thomas distribution variance is equal to $$\frac{D-1}{D^2(D+1)}.$$

4. The method of claim 1, wherein the depolarizing channel parameter c is equal to zero, and wherein the plurality of data items are distributed according to a δ-function located at 1/D.

5. The method of claim 1, wherein the random quantum circuits comprise random quantum circuits generated for a cross entropy benchmarking experiment.

6. The method of claim 1, wherein a random quantum circuit comprises a quantum circuit that includes one or more quantum gates that are randomly sampled from a predetermined set of quantum gates.

7. The method of claim 1, wherein the random quantum circuits each comprise a same number of quantum gates.

8. The method of claim 1, wherein the purity comprises single qubit purity, and wherein the random quantum circuits each comprise multiple single qubit quantum gates with error rates within a same predetermined range.

9. The method of claim 1, wherein the purity comprises n-qubit purity, and wherein each of the random quantum circuits comprises i) multiple single qubit quantum gates with error rates within a same predetermined range, and ii) a same n-qubit quantum gate.

10. The method of claim 1, further comprising:
processing the obtained plurality of data items to determine a quantum state fidelity of the multiple output quantum states; and
computing a difference between the determined quantum state fidelity and the determined average purity loss, wherein the computed difference represents systematic control error.

11. The method of claim 10, further comprising:
determining one or more adjustments to quantum hardware control parameters based on the computed difference representing systematic control error; and
implementing the determined one or more adjustments to perform quantum computations using quantum computing hardware.

12. The method of claim 1, further comprising:
determining one or more adjustments to quantum hardware control parameters based on the determined average purity; and
implementing the determined one or more adjustments to perform quantum computations using quantum computing hardware.

13. An apparatus comprising one or more classical and/or quantum storage devices storing instructions that are operable, when executed by the one or more computing devices, to cause the one or more computing devices to perform operations for determining an average purity of multiple output quantum states, wherein the multiple output quantum states correspond to applications of respective random quantum circuits of a same circuit depth to a same initial quantum state, the operations comprising:

applying, by the quantum hardware, the respective random quantum circuits of the same circuit depth to the same initial quantum state of the qubits of the quantum hardware by sending one or more control signals to change a state of the quantum hardware from the initial quantum state to a state in which logic gates included in the random quantum circuit are implemented by the qubits of the quantum hardware;

obtaining, by one or more classical processors, measurement data corresponding to measurement results of the applications of the respective random quantum circuits of the same circuit depth to the same initial quantum state of qubits of the quantum hardware, wherein the measurement results are based on a total fixed number of measurements;

representing each output quantum state by a depolarizing channel with depolarizing channel parameter p that represents a probability that the output quantum state is a pure state output;

computing the average purity of the output quantum states, comprising:

calculating, by the one or more classical processors and using the obtained measurement data, a plurality of data items, wherein each data item corresponds to a respective random quantum circuit of the same circuit depth and represents a probability that application of the respective random quantum circuit to the initial quantum state produces a respective measurement result, wherein a distribution of the probabilities represented by the plurality of data items comprises a scaled Porter Thomas distribution, wherein the scaled Porter Thomas distribution is scaled towards a uniform distribution by the depolarizing channel parameter p;

calculating, by the one or more classical processors, a variance of the scaled Porter Thomas distribution of the probabilities represented by the plurality of data items;

determining, by the one or more classical processors, a variance of an unscaled Porter-Thomas distribution having a dimension equal to a dimension D of each output quantum state; and dividing, by the one or more classical processors, the calculated variance of the scaled Porter Thomas distribution by the variance of the unscaled Porter-Thomas distribution with dimension D to determine the average purity.

14. The method of claim 1, wherein applying, by quantum hardware, the respective random quantum circuits of the same circuit depth to the same initial quantum state of qubits of the quantum hardware comprises, for each random quantum circuit, applying a pulse sequence to the initial quantum state to implement the logic gates included in the random quantum circuit.

15. The apparatus of claim 1, wherein applying, by quantum hardware, the respective random quantum circuits of the same circuit depth to the same initial quantum state of qubits of the quantum hardware comprises, for each random quantum circuit, applying a pulse sequence to the initial quantum state to implement the logic gates included in the random quantum circuit.

* * * * *